United States Patent [19]
Floyd

[11] Patent Number: 5,691,426
[45] Date of Patent: Nov. 25, 1997

[54] RESIN COMPOSITION

[75] Inventor: William Floyd, Chester, S.C.

[73] Assignee: Sequa Chemicals, Inc., Chester, S.C.

[21] Appl. No.: 807,253

[22] Filed: Feb. 28, 1997

Related U.S. Application Data

[63] Continuation-in-part of Ser. No. 420,356, Apr. 11, 1995, abandoned, which is a continuation-in-part of Ser. No. 350,692, Dec. 7, 1994, Pat. No. 5,539,077.

[51] Int. Cl.⁶ .................. C08F 283/00; C08F 8/28; C08L 61/00
[52] U.S. Cl. .......... 525/491; 528/232; 528/235; 528/242; 528/245; 528/249; 528/252; 528/254; 528/256; 428/278; 428/290; 525/480; 525/486; 525/490; 525/491; 525/509; 525/534; 525/540; 427/207.1; 427/340; 427/372.2; 427/487
[58] Field of Search ............... 528/232, 235, 528/242, 245, 249, 252, 254, 256; 428/278, 290; 525/480, 486, 490, 491, 509, 534, 540; 427/207.1, 340, 487, 372.2

[56] References Cited

U.S. PATENT DOCUMENTS

| | | | |
|---|---|---|---|
| 3,420,799 | 1/1969 | Cavitt | 260/67.6 |
| 4,835,320 | 5/1989 | Blanc et al. | 568/465 |
| 4,851,577 | 7/1989 | Chastrette et al. | 564/208 |
| 4,854,934 | 8/1989 | Wilhelm et al. | 8/185 |
| 4,968,774 | 11/1990 | Didier et al. | 528/245 |
| 5,539,077 | 7/1996 | Floyd | 528/245 |

FOREIGN PATENT DOCUMENTS 9410186  4/1994  France.

*Primary Examiner*—Sam Acquah
*Attorney, Agent, or Firm*—Mitchell D. Bittman

[57] ABSTRACT

A resin composition useful as a binder is provided comprising a mixture of a formaldehyde-based resin with a resin substitute comprising the reaction product of an amine derivative chosen from melamine, glycolurile or their mixtures with 1 to 2 moles of a $C_1$ to $C_8$ dialkoxyethanal, the reaction product is mixed, preferably reacted, with a polyol.

24 Claims, No Drawings

RESIN COMPOSITION

This application is a CIP of 08/420,356 filed Apr. 11, 1995 now abandon, which is a CIP of 08/350,692 filed Dec. 7, 1994 now U.S. Pat. No. 5,539,077.

BACKGROUND OF THE INVENTION

A low formaldehyde alternative to phenolic, melamine, and urea resins, which are based on formaldehyde, has been desired because of regulatory and health concerns regarding formaldehyde. Due to the high performance, strength and rigidity of these thermosetting formaldehyde-based resins in industrial applications, replacement products maintaining suitable performance have been difficult to find. This invention discloses a resin substitute which can be used to substitute for a portion of the phenol-formaldehyde, urea-formaldehyde, resorcinol-formaldehyde and melamine-formaldehyde resins in many applications, but contains no phenol or formaldehyde and provides the additional benefit of scavenging free formaldehyde from the resin composition mixture. These are thermosetting, film-forming resin compositions which offer tensile strength, rigidity and water-resistance comparable to the phenol-formaldehyde, melamine-formaldehyde and urea-formaldehyde resins now in use.

French Patent Application number 94-10186 filed Aug. 22, 1994 by Societe Francaise Hoechst discloses a novel aminoplast resin comprising the reaction product of an amine derivative such as melamine, glycolurile or their mixtures with an aldehyde of the formula R—CHO in which R represents a dialkoxy methyl group, 1,3-dioxolan-2-yl possibly substituted up to 4 and/or 5 times by one or more alkyl groups (preferably up to $C_4$ alkyl), or a 1,3-dioxan-2-yl group possibly substituted up to 4, 5 and/or 6 times by one or more alkyl groups (preferably up to $C_4$ alkyl); in mixtures possibly with glyoxal. However, these aminoplast resins do not self-condense satisfactorily, forming films which are weak, brittle and water-sensitive. Attempts to hydrolyze the acetal groups of these resins in order to increase their reactivity resulted in degradation of the melamine ring.

Thus it is an object of this invention to improve the aminoplast resins as disclosed by French Patent Application No. 94-10186 to provide a resin which can be used as a substitute for a portion of a formaldehyde-based resin providing a low formaldehyde alternative, which upon crosslinking provides films which are strong, hard, tough and water resistant. It is a further object of this invention to provide a resin substitute composition which not only reduces formaldehyde emissions by replacing a portion of the formaldehyde based resin, but also scavenges formaldehyde while maintaining physical properties. Applications for such improved resins include uses as binders for non-woven substrates such as glass, polyester and nylon fibers used in building materials, air filters or scrub pads, as well as for cellulose substrates such as automotive filters.

SUMMARY OF THE INVENTION

Briefly, the subject invention provides a resin composition comprising a mixture of a formaldehyde-based resin with a resin substitute comprising the reaction product of 1 to 2 moles of a $C_1$ to $C_8$ dialkoxyethanal with an amine derivative chosen from the group consisting of melamine, glycolurile or their mixtures, the reaction product is then mixed with a polyol having 2 or more hydroxyl groups. Optionally the amine derivative and dialkoxyethanal are also reacted with a dialdehyde, preferably glyoxal. In a preferred embodiment the polyol is reacted with the reaction product.

DETAILED DESCRIPTION

The resin composition comprises a mixture of a formaldehyde-based resin with a resin substitute. The resin substitute comprises a reaction product mixed with a polyol. The formaldehyde-based resin, includes but is not limited to phenolic resins, melamine resins, resorcinol resins and urea resins. The resin substitute reaction product is the addition product of an amine derivative with dialkoxyethanal. The amine derivative is either melamine, glycolurile or a mixture thereof, with melamine preferred because the products provide stronger and tougher films.

The $C_1$–$C_8$ dialkoxyethanal is reacted with the amine derivative generally at a molar ratio of about 1 to 2 equivalents of dialkoxyethanal to melamine and about 1 to 2 equivalents for glycolurile, preferably about 1.5 to 1.75 equivalents of dialkoxyethanal to the amine derivative. In addition a dialdehyde, preferably glyoxal, can also be included in the reaction product in order to provide branching points in the molecular structure, and to promote a higher molecular weight. The dialdehyde is added generally at a level of 0.05 to 1.5 preferably 0.5 to 1, molar equivalents of aldehyde to the amine derivative.

The $C_1$ to $C_8$ dialkoxyethanal generally has the following formula:

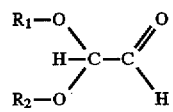

wherein $R_1$ and $R_2$ are $C_1$–$C_8$ alkyl or $R_1$ and $R_2$ are joined to form a cyclic dioxolano or a dioxano substituent. The $C_1$ to $C_8$ dialkoxyethanol can also be described as a glyoxal monoaceacetal which the acetal is comprised of linear substituents or is a cyclic aceml. Preferably $R_1$ and $R_2$ are a $C_1$–$C_4$ alkyl group, preferably the same group and preferably a methyl group, i.e. dimethoxyethanal (DME), as this is the most economical derivative which is commercially available, manufactured by Societe Francaise Hoechst and sold under the trademark Highlink DM™.

A particular stoichiometry of diaibxyethanal and the amine derivative, in particular dimethoxyethanal (DME) and melamine forms a resin substitute that enhances the performance of a formaldehyde-based resin such as phenolic resin, and reduces the formaldehyde emissions significantly more than expected by merely removing some of the phenolic resin. A melamine resin containing up to about 2 moles, preferably about 1.5 to 1.75 moles, of DME per mole of melamine forms a stable solution when prepared with polyols. A DME-melamine resin of this stoichiometry without the polyols is not stable. However, this DME-deficient resin does not have the tensile strength of a more fully substituted resin, i.e. a resin containing 2.75 to 3.0 equivalents of DME per mole of melamine plus polyol. It would be expected that such a DME-deficient resin would be an inferior candidate for a phenolic replacement or extender because it forms weak, water sensitive and brittle films. It was unexpectedly found that this DME deficient resin caused improved performance when mixed with a formaldehyde-based resin, such as phenolic resin. It also caused an unexpected increased reduction in formaldehyde emissions measured at elevated temperatures, when compared to more fully substituted DME melamine resins used at a comparable level.

It is theorized, but this invention is not limited thereto, that the polyols react with the DME substituted melamine resin through either the hydroxyl group or a methoxy group and improve the stability and solubility of the DME deficient resin. This affords a stable solution of a melamine species having an average of at least one free $NH_2$ group. A mixture of species is present in solution having either 1 or 2 free $NH_2$ groups, with only a minor insignificant amount of trisubstituted material. These free $NH_2$ groups react readily with the methylol groups of the phenolic resin and also with the free formaldehyde present. This cross-links the phenolic resin and scavenges the formaldehyde. The scavenged formaldehyde remains substantially bound even at temperatures up to 200° C.

In addition to the reaction product a polyol having 2 or more hydroxyl groups is mixed in to form the resin substitute. Suitable polyols include dialkylene glycol, polyalkylene glycol, glycerin, alkoxylated glycerin, polyvinyl alcohol, dextrose (and dextrose oligomers and derivatives such as corn syrup), starch, starch derivatives, polyglycidol or polysaccharrides (and derivatives). Preferred polyols are dipropylene glycol, triethoxylated glycerin, polyvinyl alcohol and mixtures thereof. The polyol is added at a level of at least 0.05 molar equivalents of polyol to the reaction product, preferably at least 0.1 molar equivalents. Generally the resin substitute comprises an amount of about 1% to 99%, with 15–50% preferred of polyol by weight (dry basis) of the resin composition. Through the addition of a polyol to the DME-deficient reaction product a stable resin substitute is provided which is capped and is inhibited from disproportionating to soluble, trisubstituted melamine derivatives and insoluble monosubstituted melamine derivatives.

In a preferred embodiment in the resin substitute the polyol is reacted with the reaction product. The resultant resin composition containing the resin substitute has been shown to have significantly improved properties, namely improvement in stability, ambient tensile and hot wet tensile for a textile product using the resin composition as a binder where the polyol is reacted with the reaction product verses being mixed with the reaction product. Generally the polyol is reacted with the reaction product under the following conditions: 75° to 110° C., or at reflux; at a pH of 4–7, preferably 5.5 to 6.5; and for a time period of 0.5 to 5 hours, preferably 2–3 hours.

Generally, the resin composition comprises from 20 to 99%, preferably 50 to 85% (by dry weight) of the formaldehyde-based resin and 80 to 1%, preferably 50 to 15% (by dry weight) of the resin substitute (e.g. DME/ melamine/polyol). With the use of the resin substitute as a partial replacement for the formaldehyde based resin increased dry and hot wet tensile strength and reduced free formaldehyde levels were observed.

The addition of an acid catalyst to the resin composition is also desirable. Suitable catalysts are sulfuric acid, hydrochloric acid, phosphoric acid, p-toluene sulfonic acid, methane sulfonic acid, aluminum salts such as aluminum hydroxychloride and aluminum chloride, magnesium chloride, zirconium sulfate and zinc chloride and the like. These catalysts facilitate the reaction(s) which effects the crosslinking and scavenging. The acid catalyst is generally added in an amount of 0.1% to 15% preferably, 1% to 10% based on the weight (dry basis) of the reaction product.

This resin composition is useful as a binder for cellulosic automotive oil filters, or for fiberglass in such uses as fiberglass, textiles or insulation. The resin composition can be added to a hydroxyl containing polymer (e.g. polyvinyl alcohol wherein the resin composition is used to crosslink the polymer. The performance of the formaldehyde-based resin binder can be maintained, while formaldehyde emissions are greatly reduced.

EXAMPLE 1

Resin substitute formulations were prepared having DME/melamine molar ratios of 1.0:1.0, 1.25:1.0, 1.5:1.0, and 1.75:1.0 with proportionately increased amounts of polyols present. These formulations are shown in Table 1. Reactants were loaded, pH adjusted to around 6.0, then heated to reflux for 2 hours.

The melamine in samples A and B did not fully dissolve and remained as a precipitant. Samples C and D were clear amber solutions in which the melamine totally dissolved and did not precipitate upon cooling. Samples C and D were stable and preferred for use, thus establishing a lower preferred limit for the composition of between 1.25 and 1.5 moles of DME per mole of melamine for a stable product.

TABLE 1

|  | A | B | C | D |
| --- | --- | --- | --- | --- |
| DME/melamine molar ratio | 1:1 | 1.25:1 | 1.5:1 | 1.75:1 |
| DME, 60% | 175 | 220 | 260 | 303 |
| Melamine | 126 | 126 | 126 | 126 |
| dipropylene glycol | 30 | 37 | 43 | 50 |
| glycerin triethoxylate | 20 | 25 | 30 | 35 |

EXAMPLE 2

Alternatively, a resin substitute may be prepared by a 2-stage process. To a 1 liter flask fitted with a condenser, stirrer and thermocouple temperature controller was added 303.3 grams of 60% dimethoxyethanal (1.75 moles) and 126 grams of melamine (1.0 mole). The pH was 5.9. This was heated to reflux (103° C.) for 1 hour. While still at this temperature, 50 grams of glycerin triethoxylate (0.2 moles) and 35 grams of dipropylene glycol (0.26 moles) were added. Reflux was continued for 1 hour. The reaction was diluted with 140 grams of water and allowed to cool. This afforded a resin similar in performance to sample D above.

EXAMPLE 3

Resin substitutes may also be prepared by reacting the DME and melamine at pH 9.0–9.5 at 60° C. for 2 hours, then adding the polyols, adjusting the pH to 6.0–6.5 and refluxing for 2 hours. Results are comparable.

EXAMPLE 4

Using either of the procedures in Examples 1–3 above, a Lewis acid catalyst may be added with the polyols to facilitate transetherification between the polyol hydroxyls and the DME acetat methyl ethers. Results are similar, but viscosity is 200–500 cps higher. Suitable catalysts are magnesium chloride, aluminum chloride, zinc chloride and the like.

EXAMPLE 5

A comparative resin was prepared by charging to a 1 liter flask 477 grams of 60% DME (2.75 moles) and 126 grams (1.0 mole) of melamine. The pH of the slurry was 5.8. This was heated to reflux for 1 hour. At this time, 106.2 grams of glycerin triethoxylate (0.47 mole) 70.8 grams dipropylene glycol (0.52 mole) and 7.5 grams of a 32% solution of magnesium chloride were added and refluxed 2 more hours. The reaction was then cooled to afford a dark amber solution.

EXAMPLE 6

The resin substitute of Example 1 and the comparative resin of Example 5 were used at a level of 25% (by dry weight) to extend an aqueous phenolic resin (molar ratio of 3 formaldehydes per phenol) used commercially for automotive oil filter media. This aqueous phenolic resin had a pH of 8.8, solids of 50.1%, and a free formaldehyde content of 4.4% as measured by a cold sulfite method. A vacuum oven with a series of impingers was used to capture formaldehyde emissions at elevated temperatures. The 0.1 gram sample of either the pure phenolic resin or an extended phenolic resin was placed into the oven after the oven was equilibrated at the desired temperature. Air was drawn through the oven for 20 minutes and captured in a buffered solution of 0.2% hydrazine sulfate. The impinger solutions were combined, diluted to volume and analyzed by polarography. The formaldehyde detected was reported as "%" or "ppm" as appropriate. Samples were tested at 95° C. and 200° C. Air blanks were drawn between samples. By substituting 25% of the phenolic resin, it would be expected to reduce evolved formaldehyde by around 25%. The comparative resin of Example 5 did slightly better than this. It is believed to be a mixture of mostly trisubstituted melamine products, but also a minor amount of less substituted melamine products which could also scavenge free formaldehyde. The resin substitute of Example 1 did significantly better than this. It is believed to be mostly mono- and di-substituted melamine products having free $NH_2$ groups to react with formaldehyde, with very little trisubstituted product. Results are shown in Table 2.

TABLE 2

|  | RESIN | | | | Temp, °C. |
| --- | --- | --- | --- | --- | --- |
|  | A | B | C | D |  |
| phenolic | 100 | 75 | 75 | 99 |  |
| Ex 1 |  | 24 |  |  |  |
| Ex 5 |  |  | 24 |  |  |
| $MgCl_2$ |  | 1 | 1 | 1 |  |
| Calculated % $CH_2O$ | 0.38 | 0.28 | 0.28 | 0.38 | 95° C. |
| Measured % $CH_2O$ | 0.38 | 0.12 | 0.22 | 0.38 |  |
| Calculated % $CH_2O$ | 2.9 | 2.2 | 2.2 | 2.9 | 200° C. |
| Measured % $CH_2O$ | 2.9 | 1.6 | 2.0 | 2.9 |  |

EXAMPLE 7

While the dry and hot wet tensile strength of a DME-deficient resin substitute is significantly less than that of a phenolic resin, the mixture of this resin substitute and a phenolic resin is observed to be equal to or better than either component. Formulations shown in Table 3 were padded onto Whatman paper, then dried and cured at 325° F. for 5 minutes. Samples were tested for ambient tensile and hot wet tensile strength.

TABLE 3

|  | RESIN | | |
| --- | --- | --- | --- |
|  | A | B | C |
| phenolic | 100 | 74 | — |
| EX 1 | — | 24 | 97 |
| $MgCl_2$ |  | 2 | 3 |
| % add-on | 20.3 | 20.7 | 23.0 |
| Dry tensile, Kg | 7.7 | 8.2 | 4.7 |
| Hot wet tensile, Kg | 5.83 | 5.82 | 3.36 |

The resin substitute exhibits a unique ability to scavenge formaldehyde and maintain or improve the physical properties of the phenolic resin. This would allow lasers of phenolic resins to blend these products with their resin and lower formaldehyde emissions to improve air quality without sacrificing performance. The synergy that exists between these DME/melamine resins which perform poorly by themselves, yet enhance the performance of the phenolic resins is quite unexpected. The blend of the phenolic resin and these DME-deficient resins performs better than either product alone. This synergy is not observed between phenolic resins and fully substituted DME/melamine resins. The resin substitute is also suitable for extending melamine-formaldehyde or urea formaldehyde resins to improve performance and scavenge formaldehyde.

What is claimed is:

1. A resin composition comprising:
   a mixture of a formaldehyde-based resin with a resin substitute comprising the reaction product of about 1 to 2 moles of a $C_1$ to $C_8$ dialkoxyethanal with an amine derivative chosen from the group consisting of melamine, glycolurile and their mixtures and a polyol having 2 or more hydroxyl groups.

2. Resin composition of claim 1 wherein the polyol is reacted with said reaction product.

3. Resin composition of claim 2 wherein the reaction product comprises a molar ratio of about 1.5 to 1.75 molar equivalents of dialkoxyethanal to the amine derivative and at least 0.05 molar equivalents of polyol to the reaction product.

4. Resin composition of claim 3 wherein the formaldehyde-based resin is chosen from the group consisting of a melamine resin, a phenolic resin, a resorcinol resin, a urea resin and mixtures thereof.

5. Resin composition of claim 4 comprising 20 to 99% by dry weight of the formaldehyde-based resin and 80 to 1% by dry weight of the resin substitute.

6. Resin composition of claim 5 comprising 50 to 85% of the formaldehyde-based resin and 15 to 50% of the resin substitute.

7. Resin composition of claim 1 wherein the reaction product is of the amine derivative, the dialkoxyethanal and further comprises a dialdehyde.

8. Resin composition of claim 7 wherein the dialdehyde is glyoxal.

9. Resin composition of claim 8 wherein the reaction product comprises 0.05 to 1.5 molar equivalents of glyoxal to the amine derivative.

10. Resin composition of claim 9 wherein the reaction product comprises 0.5 to 1 molar equivalents of glyoxal to the amine derivative.

11. Resin composition of claim 1 wherein the polyol is selected from the group consisting of dialkylene glycol, polyalkalene glycol, glycerine, alkoxylated glycerin, polyvinyl alcohol, dextrose, dextrose oligomers, polysaccharide derivatives, starch, starch derivatives, polyglycidol and their mixtures.

12. Resin composition of claim 11 wherein the polyol as chosen from the group consisting of dipropylene glycol, triethoxylated glycerin, polyvinyl alcohol and mixtures thereof.

13. Resin composition of claim 10 comprising 15 to 50% by weight of polyol by weight of the resin substitute.

14. Resin composition of claim 1 further comprising an acid catalyst.

15. Resin composition of claim 14 comprising 0.1% to 15% of acid catalyst by weight of the reaction product.

16. Resin composition of claim 15 wherein the acid catalyst is chosen from the group consisting of sulfuric acid, hydrochloric acid, phosphoric acid, p-toluene sulfonic acid, aluminum chloride, magnesium chloride, zirconium sulfate, zinc chloride and aluminum hydroxychloride.

17. Resin composition comprising: a mixture of a formaldehyde-based resin with a resin substitute comprising the reaction product of an amine derivative chosen from the group consisting of melamine, glycolurile and their mixtures and about 1 to 2 moles of a compound having the following formula:

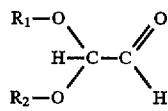

wherein $R_1$ and $R_2$ are $C_1$–$C_8$ alkyl or $R_1$ and $R_2$ are joined to form a cyclic dioxolano or a dioxano substituent, and wherein a polyol having 2 or more hydroxyl groups is added to the reaction product.

18. Resin composition of claim 17 wherein $R_1$ and $R_2$ are $C_1$–$C_4$ alkyl group.

19. Resin composition of claim 18 wherein $R_1$ and $R_2$ are a methyl group.

20. Resin composition of claim 18 wherein $R_1$ and $R_2$ are the same.

21. Resin composition of claim 17 wherein the reaction product is reacted with the polyol.

22. Resin composition of claim 17 wherein the formaldehyde containing resin is chosen from the group consisting of a melamine resin, a phenolic resin, a resorcinol resin, a urea resin and their mixtures.

23. Process for binding a substrate comprising applying the resin composition according to any of claims 2, 4, 6 or 9 to a substrate, followed by curing the resin to crosslink the binder.

24. Process of claim 23 wherein the substrate is chosen from the group consisting of glass, polyester, nylon, nonwoven substrates and cellulose substrates.

* * * * *